UNITED STATES PATENT OFFICE 2,590,411

CERIUM ACTIVATED ALUMINATE PHOSPHORS ACTIVE IN THE ERYTHEMAL RANGE

Sampson Isenberg, Chicago, Ill., assignor, by mesne assignments, to Pollak Luminescent Corporation, Chicago, Ill., a corporation of Illinois No Drawing. Application December 18, 1947, Serial No. 792,619

2 Claims. (Cl. 252—301.6)

My invention relates to luminescent materials which emit radiations in the erythemal range.

For many purposes, it is desirable to provide electromagnetic radiations in the erythemal range of the spectrum, generally considered to lie between 2850 and 3300 A. (angstrom units). While luminescent materials are known which emit radiations in different regions of the spectrum, both visible and invisible, no stable substance, so far as I know, has been found to give off energy in substantial amount in the erythemal range. Two usual means of producing radiations in this general range have been employed in the past, namely, a high pressure mercury tube and a carbon arc. Both have their limitations and disadvantages, as, for example, the high pressure mercury tube which has its maximum emission at 3130 A., and which cannot be varied regardless of what the desires of a user may be.

I have found that I am able to produce a luminescent material which, under the excitation of ultraviolet light, having a predominant wave length of 2537 A., converts a substantial proportion of the ultraviolet emission into emission in the erythemal range. The luminescent materials which I have discovered are all of the aluminate type activated with cerium, the combining element being one of the alkaline earth group, i. e., one of the elements of the second group of the periodic table, including the inner or sub-group. Illustrative of these luminescent materials is zinc aluminate activated with one percent of cerium, but, as will be explained below, and by reference to specific example, proportions and constituents may vary greatly within the scope of the claims. The luminescent material of my invention may contain one or a mixture of the alkaline earth elements. The substances employed to produce the aluminate may be used in such proportions that a considerable proportion of one or the other of the original reactants may be left in the final product. My luminescent material may be thought of as a cerium activated reaction product of aluminum oxide and an oxide of an element in the second group of the periodic table wherein the molal ratio of the reactants may vary, for example, from one mol of aluminum oxide to from one to about four mols of the oxide of the second group. The proportion of cerium may be between about .05% and about 5%. Those skilled in the art will understand that while it is preferable to employ the oxides of the elements as starting materials, carbonates or other salts may be employed which, on firing in a reducing atmosphere, are converted to the oxide, and providing, of course, that in calculating percentages of starting material the calculation is based on the oxide. For all practical purposes, therefore, and in the future discussion of the invention, it will be presumed that the starting materials are the oxides.

In my development work to date, I obtained my best results with a substantially pure zinc aluminate activated with cerium. Aluminates of other elements seem to be less emissive in the desired erythemal range, substantially in the order of calcium as being next to zinc, followed by strontium, barium, magnesium, beryllium, cadmium, and mercury. The latter shows some emission under the conditions in which I have used it but not enough to warrant its adoption on a practical scale. The use of radium is not practical because of its radio-activity. Mixtures of the desired aluminates may be employed. Going in the direction of decreased aluminum ion with respect to the alkali earth metal ion, the apparent upper limit is about three excess mols of the oxide. As an example, zinc aluminate with one complete additional mol of zinc oxide when suitably produced and activated with cerium shows considerable emission in the erythemal range. But when the total excess zinc oxide reaches three mols, the power to emit in the desired range is substantially lost.

Certain examples of the manner of practising my invention, and the results thereof, are given below:

Example 1

To produce a product comprising essentially zinc aluminate activated with cerium $$(ZnAl_2O_4:Ce)$$

the following raw materials were used:

| | Parts |
|---|---|
| ZnO | 81.4 |
| $Al_2O_3$ | 102 |
| $CaF_2$ | 9.2 |
| $CeO_2$ | 1.72 |

The raw materials were carefully selected for purity and homogeneous distribution of particles. I have found it particularly desirable to use the products in a relatively fine state of division and with the individual particles as uniform as possible. In the case of the aluminum oxide, for example, the average particle size was .1 micron with very few particles larger than .3 micron.

The ingredients were thoroughly ball milled in a porcelain mill using porcelain balls for six hours and the milled mixture was passed through a 325 mesh screen. The sifted mixture was packed into a zircon crucible and heated in a reducing atmosphere at 1300 degrees C. for 45 minutes. After cooling, the fired material was passed through a 200 mesh screen and tested for activity.

The activity test was made by subjecting the material to ultraviolet light and measuring emissibility under controlled conditions as follows:

The luminescent material to be tested was dusted uniformly onto a glass surface of a shallow glass container and covered with a quartz slide to provide a smooth top surface and uniform packing of the material. Ultraviolet light, over 95% having a wave length of 2537 A., was then directed to the surface and permitted to reflect back to a spectrograph set up to expose a sensitive photograph film. Standard exposure conditions were maintained so that the portions of the film exposed by the reflected radiation could be associated with the wave lengths causing the same.

In the case of the material of Example 1, the spectrograph showed radiations of about 2537 A., a substantial amount of radiation from about 2850 to 3300 A. with the peak between about 3100 and 3200 A., and with relatively little radiation in any region above about 3600 A.

To confirm the spectrographic tests, measurements were also made by the use of filter techniques. A 9 mm. quartz tube was mounted and its emitted energy found to be 96% at 2537 A. A 15 mm. tube was internally coated with the luminescent material, and the coated tube slipped over the quartz tube. A reasonably accurate quantative determination showed that 32% of the emitted radiations were at 2537 A., 30% of the radiation was between 2850 and 3300 A. and 38% was above 3300 A. The material of Example 1 was also coated on the inside of both a quartz tube and a cordex D glass tube and each such tube processed to produce a low pressure mercury vapor lamp. The emission from such lamps was measured and it was found that roughly about ⅓ of the energy was at 2537 A., ⅓ in the region 2850 to 3300 A., and ⅓ above 3300 A.

Since the standard test described hereinabove, in which light is reflected from the surface of the luminescent material, can be more accurately controlled and is less subject to the introduction of errors caused by unknown factors, I have found it advantageous to employ this test for development purposes, and in the examples below I shall refer only to the results of this test. It will be understood, however, that I have made confirming tests in many instances. In addition to confirming the standard test, I have shown by the lamp tests that the materials are stable under usual operating conditions.

*Example 2*

To produce a product comprising essentially zinc aluminate activated with cerium but containing additional proportions of aluminum oxide (the product corresponding to the formula $$ZnAl_2O_4.4Al_2O_3:Ce)$$

the following starting materials were employed:

| | Parts |
|---|---|
| ZnO | 81.4 |
| $Al_2O_3$ | 612 |
| $CaF_2$ | 20 |
| $CeO_2$ | 7 |

The starting materials were treated as in Example 1 and the resulting fired product passed through a 200 mesh screen and tested for activity in the erythemal and surrounding ranges. The spectrograph showed a somewhat greater proportion of emission in the 2537 A. range but with substantial and definite emission in the range from 2900–3300 A.

*Example 3*

To produce a material comprising essentially $ZnBeAl_2O_4:Ce$, the following starting materials were used:

| | Parts |
|---|---|
| ZnO | 40.7 |
| $Al_2O_3$ | 102 |
| BeO | 12.5 |
| $MgF_2$ | 9.2 |
| $CeO_2$ | 1.7 |

The product was ball milled as in previous examples and fired at 1350 degrees C. for one hour. The sintered material was cooled and passed through a 200 mesh screen. Spectrographic analysis showed definite emission in the erythemal range, the material, however, being slightly less efficient than that prepared in accordance with Example 1.

*Example 4*

A product was prepared consisting essentially of $CaAl_2O_4.3Al_2O_3:Ce$, the following starting materials being used:

| | Parts |
|---|---|
| CaO | 56 |
| $Al_2O_3$ | 510 |
| $CaF_2$ | 18.4 |
| $CeO_2$ | 5.16 |

After thoroughly ball milling in such manner as to avoid contamination, the product was fired at 1400 degrees C. for 45 minutes. The resulting material showed marked emission in the erythemal range although it was somewhat less efficient as an emitter in this range than the material prepared in accordance with Example 3.

*Example 5*

To produce a product corresponding to the empirical formula $ZnAl_2O_4.ZnO:Ce$, the following starting materials were used:

| | Parts |
|---|---|
| ZnO | 162.8 |
| $Al_2O_3$ | 102 |
| $MgF_2$ | 9.2 |
| $CeO_2$ | 3.4 |

After thorough ball milling, the material was fired at 1325 degrees C. for 90 minutes. The resulting material, when inspected by the spectrographic method showed substantial emission in the erythemal range although the conversion efficiency was less than in the previously discussed examples.

Those skilled in the art will understand that many variations in preparation techniques may take place in the practice of my invention. I referred to particular methods of grinding but those in the art will understand that the need is for thorough grinding and mixing with as little contamination of the product as possible and with such contamination as must occur of a type which will not affect the product deleteriously. So also in the use of crucibles, it will be understood that any crucible which is relatively inert and which will not introduce objectionable impurities may be employed such as an alumina, silica, or sillimanite crucible.

While all of the substances coming within the class identified hereinabove will produce radiations in the erythemal range, some modified distribution characteristics are noted and these I have found may be affected somewhat by combinations of factors such as firing time. The proportion of the cerium used not only affects the amount of emission in the erythemal range but may to a considerable extent have an effect upon the particular distribution of the emission. By careful control, therefore, it is possible, given a particular matrix, to accentuate the emission in a narrow region as, for example, in the region of 3080 A., tests having indicated that this particular wave length is most active in producing erythema, and, assuming this to be the case, the greater the emission at this wave or in the immediate vicinity thereof the more desirable the material for some intended purposes.

What I claim as new and desire to protect by Letters Patent of the United States is:

1. As a luminescent material active in the erythemal range, zinc aluminate containing about 1% of cerium as an activator.

2. As a luminescent material, active in the erythemal range, a member selected from the group consisting of an aluminate of a metal selected from the group consisting of zinc, calcium, strontium, barium, magnesium, beryllium and cadmium, and containing cerium as an activator in the proportion of from about 0.05% to 5%.

SAMPSON ISENBERG.

REFERENCES CITED

The following references are of record in the file of this patent:

UNITED STATES PATENTS

| Number | Name | Date |
| --- | --- | --- |
| 2,116,167 | Espig | May 3, 1938 |
| 2,392,814 | Froelich | Jan. 15, 1946 |

FOREIGN PATENTS

| Number | Country | Date |
| --- | --- | --- |
| 311,938 | Italy | Oct. 16, 1933 |

OTHER REFERENCES

De Boisbaudran, articles, 1887, 104, Comptes Rendus, pp. 331, 332.

De Boisbaudran, articles, 1887, 105, Comptes Rendus, p. 347.

Nichols: Cathodo-Luminescence, 1928, publ. Carnegie Institute of Wash., pp. 79–80.